United States Patent
Baskin et al.

(10) Patent No.: US 10,933,992 B2
(45) Date of Patent: Mar. 2, 2021

(54) BLADE FOLD SYSTEM USING FLAP HINGE

(71) Applicant: Sikorsky Aircraft Corporation, Stratford, CT (US)

(72) Inventors: Bryan Kenneth Baskin, Arlington, TX (US); Frank P. D'Anna, Seymour, CT (US); Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 662 days.

(21) Appl. No.: 15/336,195

(22) Filed: Oct. 27, 2016

(65) Prior Publication Data
US 2017/0297678 A1    Oct. 19, 2017

Related U.S. Application Data

(60) Provisional application No. 62/246,986, filed on Oct. 27, 2015.

(51) Int. Cl.
*B64C 29/02* (2006.01)
*B64C 11/28* (2006.01)
*B64C 27/50* (2006.01)

(52) U.S. Cl.
CPC .............. *B64C 29/02* (2013.01); *B64C 11/28* (2013.01); *B64C 27/50* (2013.01)

(58) Field of Classification Search
CPC ......... B64C 11/28; B64C 27/39; B64C 27/50; B64C 29/00; B64C 29/02; B64C 29/0008; B64C 29/0016; B64C 29/0033; B64C 2201/102; B64C 2201/20
See application file for complete search history.

(56) References Cited

U.S. PATENT DOCUMENTS

| | | | |
|---|---|---|---|
| 3,404,852 A | | 10/1968 | Sambell et al. |
| 3,515,500 A | * | 6/1970 | Nachod ............... B64C 29/0033 244/12.3 |
| 3,528,630 A | | 9/1970 | Ferris et al. |
| 3,592,412 A | | 7/1971 | Glatfelter |
| 5,031,858 A | * | 7/1991 | Schellhase ............. B64C 27/50 244/7 R |
| 5,062,587 A | * | 11/1991 | Wernicke ................ B64C 25/04 244/100 R |
| 5,085,315 A | | 2/1992 | Sambell |
| 8,998,125 B2 | | 4/2015 | Hollimon |
| 9,676,488 B2 | * | 6/2017 | Alber ...................... B64C 29/02 |
| 9,937,999 B2 | * | 4/2018 | Wainfan .................. B64C 11/28 |
| 2017/0217585 A1 | * | 8/2017 | Hulsman ............... B64C 39/024 |
| 2017/0297698 A1 | * | 10/2017 | Alber ..................... B64C 39/04 |

FOREIGN PATENT DOCUMENTS

GB    264992 A  *  2/1927  ............. B64C 11/28

* cited by examiner

*Primary Examiner* — Richard A Edgar
(74) *Attorney, Agent, or Firm* — Foley & Lardner LLP

(57) ABSTRACT

A rotor system of a tail-sitter aerial vehicle configured to rotate about an axis of rotation is provided including a rotor hub which rotates about the axis of rotation and at least one rotor blade operably coupled to the rotor hub. The at least one rotor blade is configured to rotate about a folding axis between an extended position where the at least one rotor blade is substantially within a plane perpendicular to the axis of rotation and a stowed position where the rotor blade is arranged out of the plane at an angle less than ninety degrees to the axis of rotation.

16 Claims, 4 Drawing Sheets

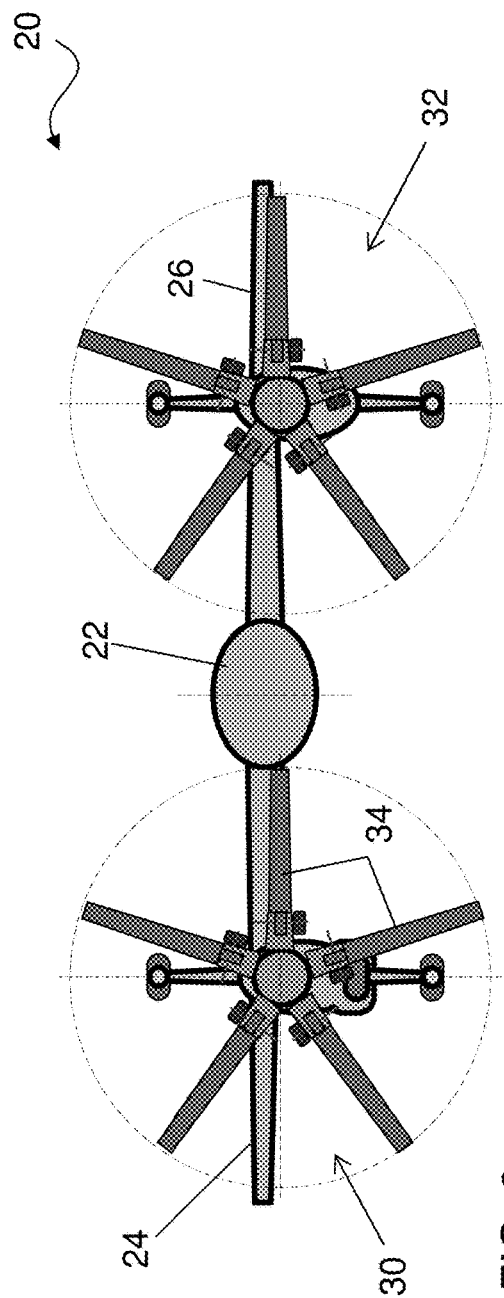
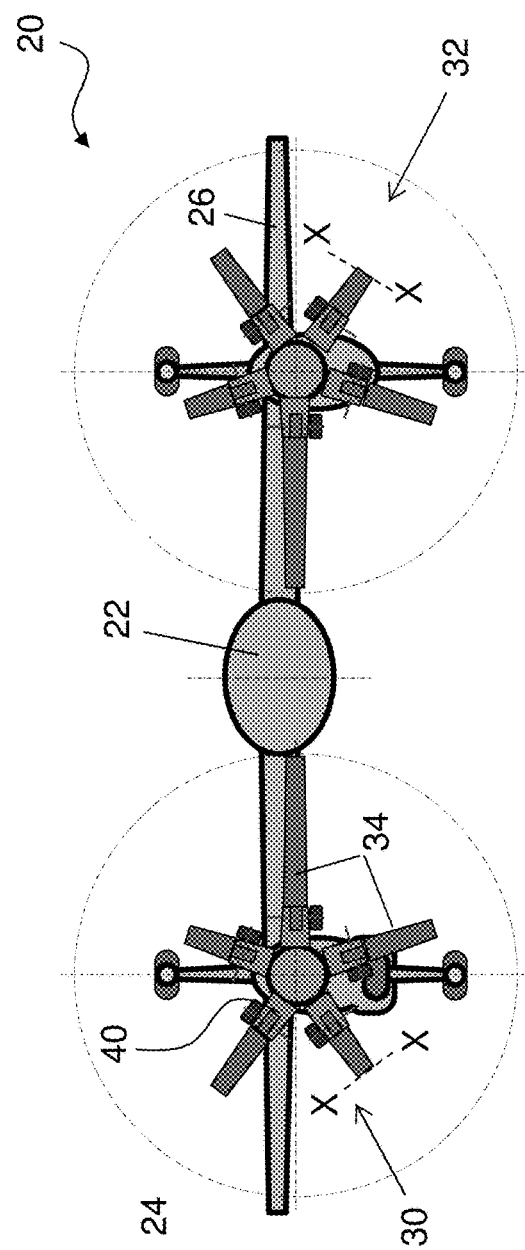
FIG. 3
FIG. 4

BLADE FOLD SYSTEM USING FLAP HINGE

CROSS REFERENCE TO RELATED APPLICATIONS

This application claims the benefit of U.S. Provisional Application Ser. No. 62/246,986, filed Oct. 27, 2015, the entire disclosure of which is incorporated herein by reference.

BACKGROUND OF THE INVENTION

Exemplary embodiments of the invention relate to an aerial vehicle, and more particularly, to a blade folding system for a rotor blade of a rotor system of the aerial vehicle.

Various types of aerial vehicles have been developed which are capable of vertical takeoff and landing, yet which also fly like an airplane. Examples of such vehicles include tilt-wing aircrafts, tilt-rotor aircrafts, and tail sitter aircrafts. These vehicles may be manned or unmanned and are capable of maneuvering easily in both normal airplane and helicopter flight modes.

The flight capabilities of such aerial vehicles make them effective for a wide variety of missions; however, operation of aerial vehicles in certain environments may be limited by the overall structural envelopes thereof. The radial dimensions of a rotor assembly results in an aerial vehicle having relatively large structural envelopes which may impact its utility in some environments. For example, space on a ship or vessel is generally at a premium and the structural envelope of an aerial vehicle may require a significant allocation of such limited space. Furthermore, strategic and tactical considerations in the military utilization of aerial vehicles has led to a requirement for aerial vehicles having main rotor assemblies that may be readily reconfigured for rapid deployment, routine transport, and/or stowage by reducing the structural envelope.

One way to reduce the structural envelope of aerial vehicles to facilitate rapid deployment, routine transport, stowage, and reduce the vulnerability thereof to environmental conditions is to design the rotor assembly so that the rotor blades fold relative to the rotor hub. However, conventional blade folding systems are cumbersome and are susceptible to drag, thereby decreasing the efficiency of the aerial vehicles in flight.

BRIEF DESCRIPTION OF THE INVENTION

According to one embodiment of the invention, a rotor system of a tail-sitter aerial vehicle configured to rotate about an axis of rotation is provided including a rotor hub which rotates about the axis of rotation and at least one rotor blade operably coupled to the rotor hub. The at least one rotor blade is configured to rotate about a folding axis between an extended position where the at least one rotor blade is substantially within a plane perpendicular to the axis of rotation and a stowed position where the rotor blade is arranged out of the plane of at an angle less than ninety degrees to the axis of rotation.

In addition to one or more of the features described above, or as an alternative, in further embodiments the tail-sitter aerial vehicle is configured to switch between a helicopter mode for vertical takeoff and landing and also for flight in an airplane mode.

In addition to one or more of the features described above, or as an alternative, in further embodiments the at least one rotor blade is configured to move between the extended position and the stowed position manually.

In addition to one or more of the features described above, or as an alternative, in further embodiments the at least one rotor blade is configured to move between the extended position and the stowed position automatically.

In addition to one or more of the features described above, or as an alternative, in further embodiments in the stowed position, the rotor blade is arranged at an angle less than 90° to the axis of rotation.

In addition to one or more of the features described above, or as an alternative, in further embodiments in the stowed position, the rotor blade is arranged substantially parallel to the axis of rotation.

In addition to one or more of the features described above, or as an alternative, in further embodiments a flapping hinge is configured to couple the at least one rotor blade to the rotor hub. The flapping hinge has a flapping axis, wherein the flapping axis acts as the folding axis.

In addition to one or more of the features described above, or as an alternative, in further embodiments the flapping hinge is positioned such that movement of the at least one rotor blade between the extended position and the stowed position does not interfere with adjacent components of the rotor system.

In addition to one or more of the features described above, or as an alternative, in further embodiments a rotor hub fairing surrounds the rotor hub. A nacelle is configured to drive rotation of the rotor system about the axis of rotation. A geometry of at least one of the nacelle and rotor hub fairing is modified to avoid interference with the at least one blade in the stowed position.

According to another embodiment, a method of stowing a tail-sitter aerial vehicle having a rotor system including a rotor hub which rotates about an axis of rotation and at least one roto blade mounted to the rotor hub which rotates in a plane substantially perpendicular to the axis of rotation of the rotor system, the method of stowing including stopping rotation of the rotor hub and folding a portion of the at least one rotor blade about a folding axis out of the plane from an extended position, which is substantially in the plane, to a stowed position which is substantially out of plane In addition to one or more of the features described above, or as an alternative, in further embodiments the folding axis is defined by a flapping hinge coupling the at least one rotor blade to the rotor hub. Another portion of the at least one rotor blade disposed between the rotor hub and the flapping hinge remains in the extended position while the portion of the at least one rotor blade folds about the folding axis from the extended position to the stowed position.

In addition to one or more of the features described above, or as an alternative, in further embodiments the aerial vehicle is configured for vertical takeoff and landing and also for flight in an airplane mode.

In addition to one or more of the features described above, or as an alternative, in further embodiments the at least one rotor blade is configured to move between the extended position and the stowed position manually.

In addition to one or more of the features described above, or as an alternative, in further embodiments the rotor system includes a plurality of rotor blades and at least one of the rotor blades does not move between the extended position and the stowed position.

In addition to one or more of the features described above, or as an alternative, in further embodiments the rotor system includes a plurality of rotor blades and all of the rotor blades are configured to move between the extended position and the stowed position.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is a front view of an aerial vehicle where the plurality of rotor blades is arranged in an extended configuration;

FIG. 4 is a front view of an aerial vehicle where at least a portion of the plurality of rotor blades is arranged in a folded configuration.

The detailed description explains embodiments of the invention, together with advantages and features, by way of example with reference to the drawings.

DETAILED DESCRIPTION OF THE INVENTION

Figure 1:
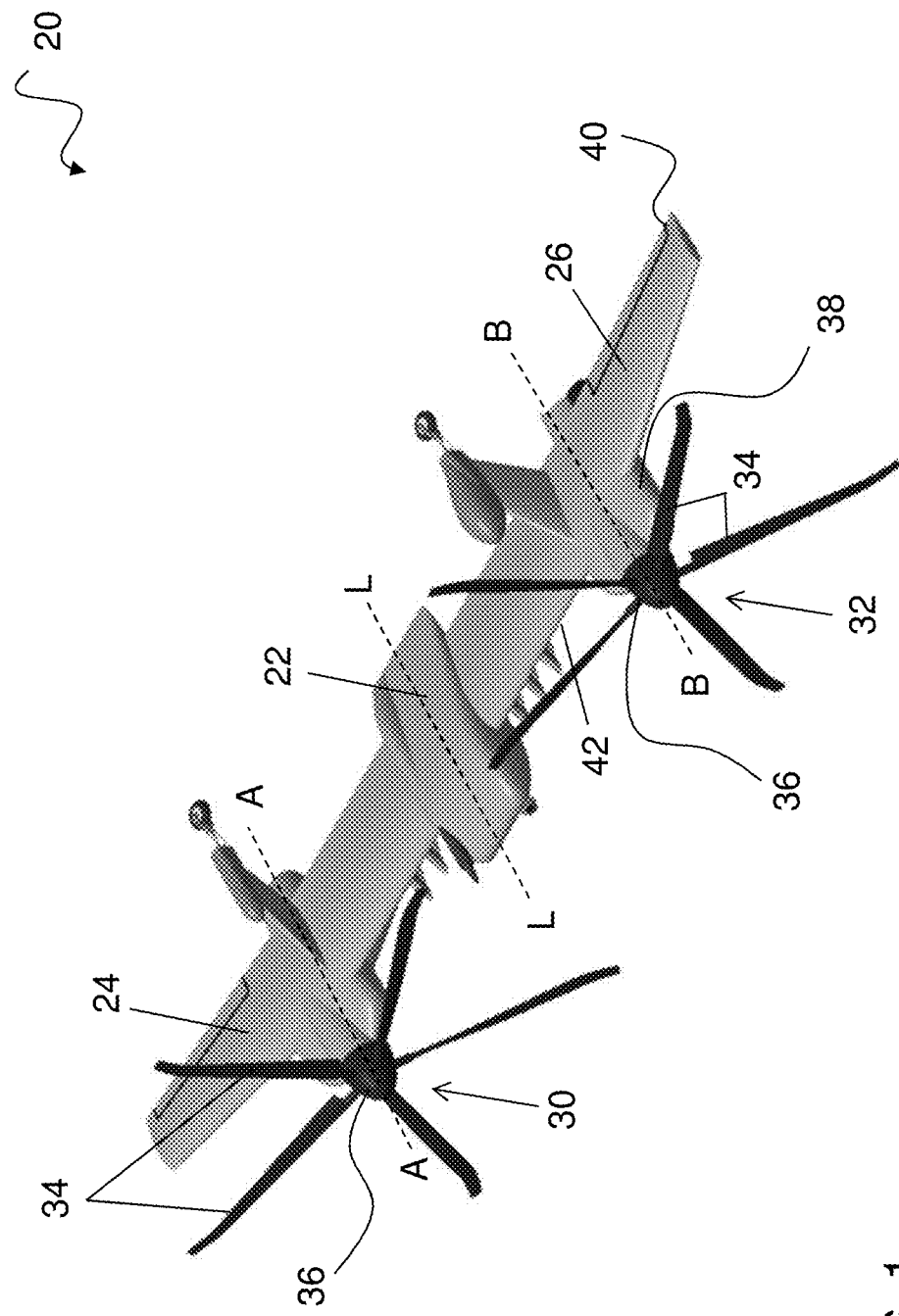
FIG. 1 is a perspective view of an example of an aerial vehicle.
Figure 2:
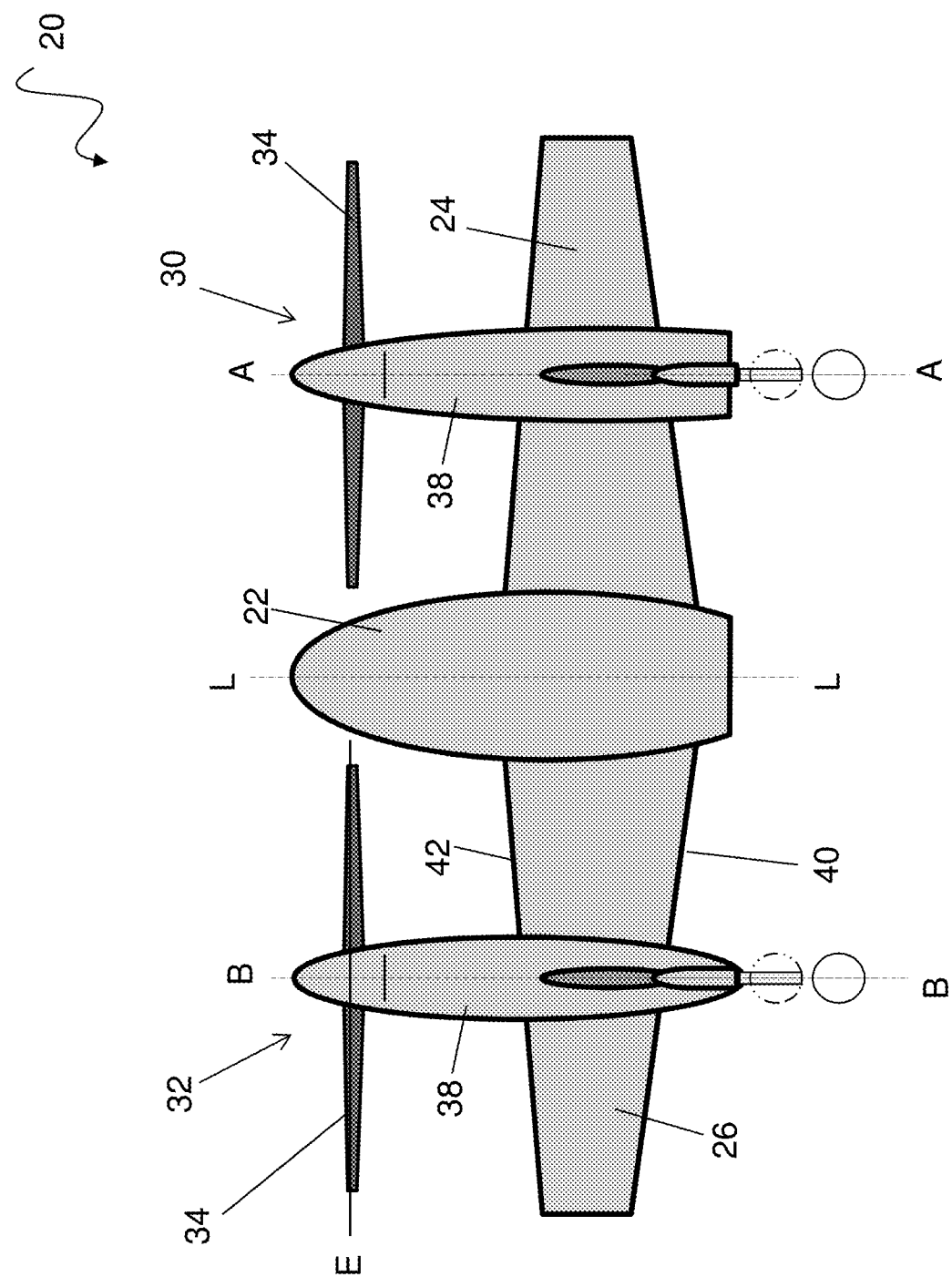
FIG. 2 is a top plan view of another example of an aerial vehicle.

FIGS. 1-2 illustrate an example of a vertical takeoff and landing (VTOL) aerial vehicle 20 also configured to fly in an airplane mode. The aerial vehicle 20 includes a center body 22 having a left wing 24 and a right wing 26. Together, the center body 22, left wing 24, and right wing 26 form the airframe of the aerial vehicle 20 and define the forward direction of flight for the aerial vehicle 20 in the airplane flight mode moving substantially parallel to the ground with the wings 24, 26 providing lift, and defining a vertical flight direction for the aerial vehicle 20 in a helicopter flight mode moving substantially vertical relative to the ground with prop-rotors 30, 32 providing the lift. As shown, the vehicle 20, also referred to as a tail-sitter, lands on its tail using wheels, although other mechanisms can be used to support the vehicle 20 while on the ground, including skids.

The vehicle 20 takes off vertically by the prop-rotors 30, 32 providing the lift in the helicopter flight mode and is able to hover. Once sufficiently airborne, the vehicle 20 rotates from the helicopter flight mode into the airplane flight mode by rotating into the direction of flight whereby the prop-rotors 30, 32 provide thrust and the wings 24, 26 provide the lift. The process is reversed when transitioning from airplane flight mode to the helicopter flight mode to allow the vehicle 20 to land tail first.

The wings 24, 26 extend outwardly from opposite sides of the center body 22, respectively. Although the wings 24, 26 are illustrated as being substantially perpendicular to the longitudinal axis L of the center body 22, other configurations of the wings 24, 26, for example swept forward wings, are within the scope of the disclosure. In the illustrated, non-limiting embodiment, the aerial vehicle 20 includes a left propeller rotor (prop-rotor) system 30 configured to rotate about a first axis of rotation A and a right propeller rotor system 32 configured to rotate about a second axis of rotation B. The left and right prop-rotors 30, 32 are mounted to the left and right wings 24, 26, respectively. The first and second rotational axes A, B may be oriented substantially horizontally and parallel to the longitudinal axis L of the airframe. Each of the prop-rotor systems 30, 32 includes a plurality of propeller blades 34 mounted to a rotor hub 36 for rotation about a respective axis A, B.

Each wing 24, 26 includes a nacelle 38 mounted near a spanwise center thereof. The nacelles 38 extend chordwise from near a trailing edge 40 of the wing 24, 26 to forward of the leading edge 42 of the wing 24, 26. In one embodiment, each nacelle 38 is oriented substantially parallel to and aligned with the rotational axes of the prop-rotor systems 30, 32. Each of the nacelles 38 contains a gearbox (not shown) for coupling the nacelle 38 to the adjacent prop rotor 30, 32. Although a particular aerial vehicle configuration is illustrated in the disclosed embodiments, other aerial vehicles configured to operate in both the helicopter flight mode and the airplane flight mode, both manned and unmanned and having single or multiple engines, are within the scope of the disclosure.

The rotor systems 30, 32 of the aerial vehicle 20 of FIGS. 1 and 2 may be fully articulated such that the blades 34 are attached to a rotor hub 36 through a series of hinges that allow each blade 34 to move independently of the others. These hinges allow the blades to flap, feather, lead, or lag independently. In another embodiment, the rotor systems 30, 32 of the aerial vehicle 20 are semi-rigid rotor systems having coupled blades 34 that flap together about flapping hinges in an equal and opposite manner. The flapping hinges are rotatable about a horizontal axis and may be coupled to an end portion of a rotor blade 34, such as a flexbeam for example. Rotation of the flapping hinge about its horizontal axis is configured to move the rotor blade coupled thereto up and down to compensate for dissymmetry of lift.

Figure 5:
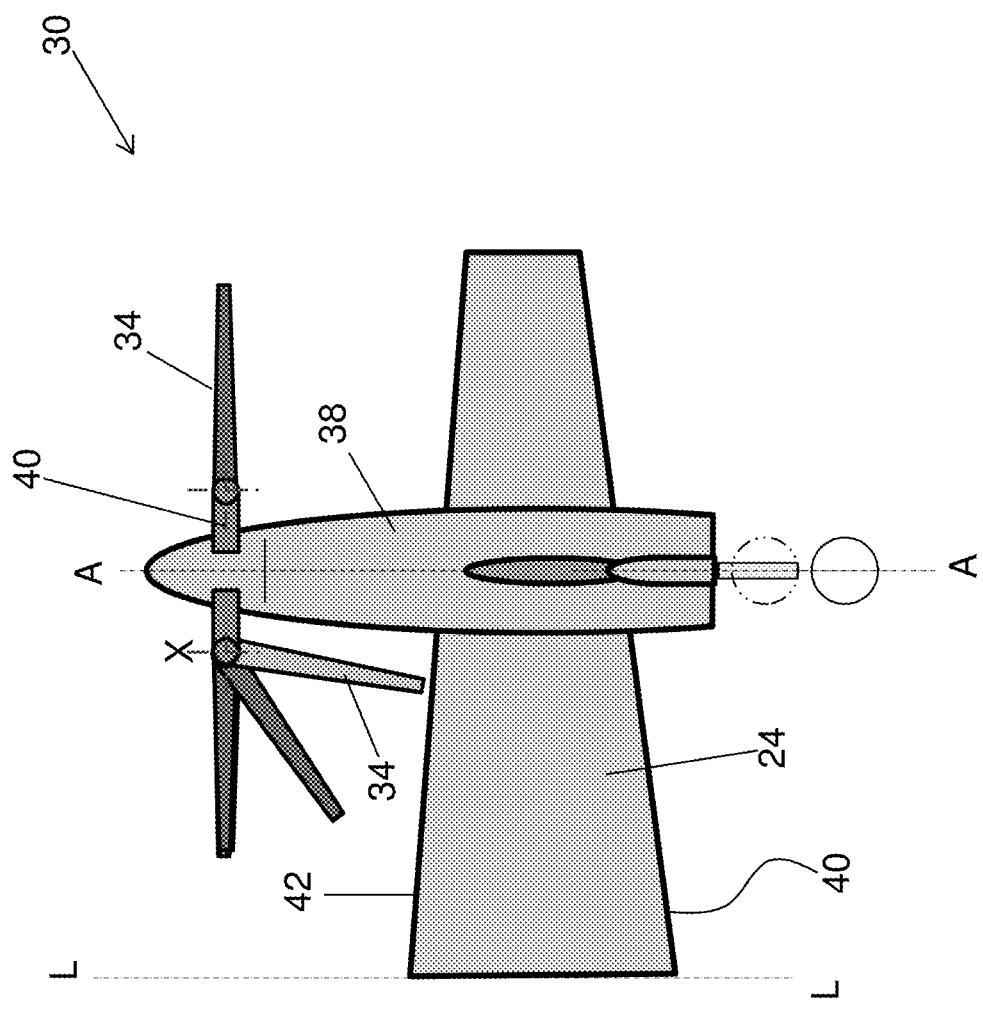
FIG. 5 is a top plan view of the aerial vehicle of FIG. 4 where at least a portion of the plurality of rotor blades is arranged in a folded configuration.

Referring now to FIGS. 3-5, at least one rotor blade 34 of the one or more rotor systems 30, 32 of the aerial vehicle 20 is movable between an extended position (FIG. 3) and a stowed position (FIG. 4). The at least one rotor blade 34 may be configured to move between the extended position and the stowed position either manually, or automatically, such as in response to an input provided to a controller of the aerial vehicle. When the rotor blades 34 are in the extended position, such as when the aerial vehicle 20 is in flight for example, the rotor blades 34 define a plane E that is oriented substantially perpendicular to the axis of rotation A, B of the rotor 30, 32. To move a blade 34 to the stowed position, such as when the aerial vehicle 20 is being stored for example, the at least one rotor blade 34 is configured to fold about a blade fold axis X extending substantially perpendicular to the axis of rotation A, B of the rotor system 30, 32. As a result, the blade 34 is configured to rotate out of the plane E defined by the plurality of rotor blades 34 in the extended position to a position substantially parallel to the axis of rotation A, B or to any position there between (between about 0° and about 90°.

In one embodiment, the folding axis X of the blade 34 is defined by the axis of a flapping hinge 40 used to mount the rotor blade 34 to the rotor hub 36 and provide upward and downward movement of the rotor blade 34. To accommodate movement of the rotor blade 34 to any position between 0° and 90° or an even greater angle, the flapping hinge 40 may include a rolling element bearing, rather than an elastomeric bearing used in conventional rotor systems. In embodiments where the blade 34 is configured to fold about the flapping hinge 40, the rotor fairing (not shown), positioned around the rotor huh 36 to improve the aerodynamic properties thereof, and the nacelle 38 may be shaped to avoid interference with the blade 34 as it transforms between the extended and stowed positions. Alternatively, an additional hinge may be located inboard of the flapping hinge 40, such that the flapping hinge 40 is located further outboard relative to the rotor hub 36 compared to conventional rotor systems. By arranging the flapping hinge 40 at a position further away from the rotor hub 36, the blade 34 is free to move between the extended and stowed positions without interference from the rotor hub fairing or nacelle 38.

As shown, not all of the blades 34, 36 need to be folded into the stowed position. Specifically, where an overlapping one of the blades 34, 36 extends over one the wings 24, 26, the overlapping blade is not lowered into the stowed position whereas the remaining blades 34, 36 are lowered into the stowed position. However, in other aspects of the invention, all of the blades 34, 36 are lowered into the stowed position.

A rotor system having folding capability provided by existing components allow for movement of the blade 34 between an extended and stowed position without compromising the structural integrity or tuning of the blade 34. Because the folding hardware is positioned generally within the rotor hub fairing and not in the airstream, the complexity and drag of the folding system is reduced compared to conventional systems.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An tail sitter aircraft, comprising:
   an airframe including a wing and a tail, wherein the aircraft is supported by at least one landing gear extending from the tail when the aircraft is grounded;
   a rotor system connected to the aircraft, the rotor system including
   a rotor hub which rotates about the axis of rotation; and
   a plurality of rotor blades operably coupled to the rotor hub, at least one of the plurality of rotor blades being configured to rotate about a folding axis defined by a flapping hinge;
   wherein when the tail-sitter vehicle is in flight, the at least one rotor blade is rotatable about the folding axis to compensate for lift imbalance of the tail-sitter vehicle, and when the aircraft is grounded, one of the plurality of rotor blades positioned adjacent the wing is not rotated about the folding axis and another rotor blade spaced from the wing is rotated about the folding axis from an extended position substantially within a plane perpendicular to the axis of rotation and a stowed position arranged out of the plane at an angle less than 90° to the axis of rotation;
   wherein the at least one landing gear extends from the tail parallel to the axis of rotation.

2. The aircraft according to claim 1, wherein the tail-sitter vehicle is configured to switch between a helicopter mode for vertical takeoff and landing when in a helicopter mode, and for flight in an airplane mode.

3. The aircraft according to claim 1, wherein the at least one rotor blade is configured to move between the extended position and the stowed position manually.

4. The aircraft according to claim 1, wherein the at least one rotor blade is configured to move between the extended position and the stowed position automatically in response to an input provided to a controller.

5. The aircraft according to claim 1, wherein in the stowed position, the rotor blade is arranged substantially parallel to the axis of rotation.

6. The aircraft according to claim 1, wherein the flapping hinge is configured to couple the at least one rotor blade to the rotor hub.

7. The aircraft according to claim 6, wherein the flapping hinge is positioned such that movement of the at least one rotor blade between the extended position and the stowed position does not interfere with adjacent components of the rotor system.

8. The aircraft according to claim 6, further comprising:
   a rotor hub fairing surrounding the rotor hub; and
   a nacelle configured to drive rotation of the rotor system about the axis of rotation, wherein a geometry of at least one of the nacelle and rotor hub fairing is modified to avoid interference with the at least one blade in the stowed position.

9. A method of stowing a tail-sitter aerial vehicle having an airframe including a wing and a rotor system including a rotor hub which rotates about an axis of rotation and at least one rotor blade mounted to the rotor hub which rotates in a plane substantially perpendicular to the axis of rotation of the rotor system, the method of stowing comprising:
   grounding the tail-sitter vehicle, wherein when the tail-sitter vehicle is grounded, the tail-sitter vehicle is supported by at least one landing gear extending from a tail of an airframe, the at least one landing gear extending parallel to the axis of rotation;
   stopping a rotation of the rotor hub; and
   folding at least one rotor blade located away from the wing about a folding axis defined by a flapping hinge out of the plane from an extended position which is substantially in the plane to a stowed position which is substantially out of the plane and leaving a rotor blade located adjacent a wing in the extended position, wherein when the tail-sitter vehicle is in flight, the at least one rotor blade is rotatable about the folding axis to compensate for lift imbalance of the tail-sitter vehicle.

10. The method according to claim 9, wherein the flapping hinge couples the at least one rotor blade to the rotor hub, wherein another portion of the at least one rotor blade disposed between the rotor hub and the flapping hinge remains in the extended position while the portion of the at least one rotor blade folds about the folding axis from the extended position to the stowed position.

11. The method according to claim 10, wherein the aerial vehicle is configured for vertical takeoff and landing and also for flight in an airplane mode.

12. The method according to claim 9, wherein the at least one rotor blade is configured to move between the extended position and the stowed position manually.

13. The method according to claim 9, wherein at least one of the rotor blades does not move between the extended position and the stowed position while remaining ones of the blades do move between the extended position and the stowed position.

14. The method according to claim 9, wherein the rotor system includes a plurality of rotor blades and all of the rotor blades are configured to move between the extended position and the stowed position.

15. A rotor system of a tail-sitter vehicle having a wing, the rotor system being configured to rotate about an axis of rotation, comprising:
  a rotor hub which rotates about the axis of rotation;
  a plurality of rotor blades operably coupled to the rotor hub, at least one of the plurality of rotor blades being configured to rotate about a flapping axis and about a folding axis, wherein when the tail-sitter vehicle is in flight, the at least one rotor blade is rotatable about the folding axis to compensate for lift imbalance of the tail-sitter vehicle, and when the tail-sitter vehicle is grounded, one of the plurality of rotor blades positioned adjacent the wing is not rotated about the folding axis and another rotor blade spaced from the wing is rotated about the folding axis from an extended position substantially within a plane perpendicular to the axis of rotation and a stowed position arranged out of the plane at an angle less than 90° to the axis of rotation;
  wherein the folding axis is separate from and parallel to the flapping axis.

16. The rotor system of claim 15, wherein the flapping axis is located outboard of the folding axis.

* * * * *